(12) United States Patent
Eskind (10) Patent No.: US 11,060,031 B2
(45) Date of Patent: Jul. 13, 2021

(54) FIRE RETARDANT COMPOSITION, STRUCTURE AND APPLICATION

(71) Applicant: US FIREBLOCK LLC, Los Angeles, CA (US)

(72) Inventor: Larry Gene Eskind, Studio City, CA (US)

(73) Assignee: US Fireblock, Los Angeles, CA (US)

( * ) Notice: Subject to any disclaimer, the term of this patent is extended or adjusted under 35 U.S.C. 154(b) by 0 days.

(21) Appl. No.: 16/043,809

(22) Filed: Jul. 24, 2018

(65) Prior Publication Data

US 2019/0010401 A1 Jan. 10, 2019

Related U.S. Application Data

(62) Division of application No. 14/507,768, filed on Oct. 6, 2014, now Pat. No. 10,131,844.

(60) Provisional application No. 61/887,084, filed on Oct. 4, 2013.

(51) Int. Cl.
| | | |
|---|---|---|
| *C09K 21/00* | (2006.01) | |
| *C09K 21/04* | (2006.01) | |
| *C09D 5/18* | (2006.01) | |
| *B22D 11/108* | (2006.01) | |
| *C09K 21/06* | (2006.01) | |
| *C09K 21/10* | (2006.01) | |

(52) U.S. Cl.
CPC ............ *C09K 21/00* (2013.01); *B22D 11/108* (2013.01); *C09D 5/18* (2013.01); *C09K 21/04* (2013.01); *C09K 21/06* (2013.01); *C09K 21/10* (2013.01)

(58) Field of Classification Search
CPC ........ C09K 21/00; C09K 21/04; C09K 21/06; C09K 21/10; C09D 5/18; B22D 11/108
See application file for complete search history.

(56) References Cited

U.S. PATENT DOCUMENTS

| 3,810,862 A | * | 5/1974 | Mathis et al. | ........... C08K 3/32 |
| | | | | 524/100 |
| 2006/0160927 A1 | * | 7/2006 | Surplice | ............... C08K 5/3472 |
| | | | | 523/179 |

* cited by examiner

*Primary Examiner* — Michael C Miggins (57) ABSTRACT

Compositions, structures and methods are described that improve fire retardant characteristics of various material, and which can be used for protecting structures, devices, or components therein. In one example, a mixture suitable for imparting heat or cold blocking properties to an object is produced. The mixture includes a catalyst comprising particles that are 8 microns or less in diameter, a charring agent comprising particles that are 8 microns or less in diameter, and a blowing agent comprising particles that are 8 microns or less in diameter. The catalyst, the charring agent and the blowing agent are mixed together in equal portions by weight to produce the mixture suitable for imparting heat or cold blocking properties to an object.

20 Claims, 4 Drawing Sheets

FIRE RETARDANT COMPOSITION, STRUCTURE AND APPLICATION

CROSS-REFERENCE TO RELATED APPLICATIONS

The present application claims the benefit of priority to and is a divisional application of U.S. patent application Ser. No. 14/507,763, titled "FIRE RETARDANT COMPOSITION, STRUCTURE AND APPLICATION," filed on Oct. 6, 2014, which claims the benefit of priority to U.S. Provisional Patent Application No. 61/887,084 titled "FIRE RETARDANT AND INSULATING COMPOSITION AND METHOD OF APPLICATION" and filed on Oct. 4, 2013. The entire contents of the before-mentioned patent applications are hereby incorporated by reference as part of the disclosure of this document.

TECHNICAL FIELD

The subject matter of this patent document relates to fire resistance material and structures that impart fire retardant and insulating properties to various materials and methods imparting such properties to the material.

BACKGROUND

Modern construction frequently utilizes steel structural elements and other materials because they are widely available, cost effective and generally exhibit desirable properties such as acceptable strength, rigidity and weight. One ever present problem, however, is the unacceptable behavior of such materials in the case of fire or intense heat. One dramatic and tragic example of such disadvantages is illustrated by the failure of the structural steel components in the World Trade Center on Sep. 11, 2001. Development of better fire resistant material is an on-going effort that can save lives, protect structures, vehicles and devices, and enable future endeavors that may currently seem not possible.

SUMMARY

This patent document discloses compositions, structures and methods that improve fire retardant characteristics of various material, and which can be used for protecting structures, devices, or components therein.

One aspect of the disclosed embodiments relates to a mixture suitable for imparting heat or cold blocking properties to an object that includes a catalyst comprising particles that are 8 microns or less in diameter, a charring agent comprising particles that are 8 microns or less in diameter, and a blowing agent comprising particles that are 8 microns or less in diameter, where the catalyst, the charring agent and the blowing agent are mixed together in equal portions by weight to produce the mixture suitable for imparting heat or cold blocking properties to an object.

In one example, the mixture further includes water in an amount that by weight is equal or greater than weight of the mixture of the catalyst, the charring agent and the blowing agent added together. For instance, the amount of water by weight can be twice the mixture of the catalyst, the charring agent and the blowing agent added together.

In one exemplary embodiment, the charring agent is ammonium polyphosphate, the charring agent is pentaerythritol, and the blowing is melamine. In another exemplary embodiment, each of the catalyst, the charring agent and the blowing agent includes particles in the range 2 microns to 8 microns. In one example, at least one of the catalyst, the charring agent or the blowing agent includes particles that are 2 microns in diameter. In still another example, at least one of the catalyst, the charring agent or the blowing agent includes particles that are on average 8 microns in diameter.

In another exemplary embodiment, the mixture of water, catalyst, charring agent and the blowing agent, when applied to a ³⁄₁₆ inch-thick steel object, imparts heat blocking characteristics to the steel object such that the steel object remains intact after application of at least 3600.degree. F. heat for 11 minutes or longer. According to one exemplary embodiment, each of the catalyst, the charring agent and the blowing agent includes only particles that are 8 microns or less in diameter.

Another aspect of the disclosed embodiments relates to a method for treatment of an object to exhibit increased heat or cold blocking properties. The method includes mixing equal amounts of a catalyst, a charring agent and a blowing agent, where each of the catalyst, the charring agent and the blowing agent includes particles that are 8 microns or less in diameter. The method further includes adding water to the mixture of the catalyst, the charring agent and the blowing agent, and placing the object submerged in the mixture including the water, the catalyst, the charring agent and the blowing agent in a sealable container. The method also includes sealing the container, applying heat to the container for a predetermined period of time so as to allow the pressure inside the container to reach and remain at a predetermined pressure value, stopping application of heat to the sealed container, and allowing the object to be cooled, thereby producing a treated object that possesses improved heat and cold blocking properties compared to the object prior to the treatment.

In one exemplary implementation of the above method, the charring agent is ammonium polyphosphate, the charring agent is pentaerythritol, and the blowing is melamine. In another exemplary embodiment, the predetermined pressure value is 70 pounds per square inch, whereas in another exemplary embodiment, the predetermined pressure value is 15 pounds per square inch. In yet another exemplary embodiment, the treated object comprises particles of the mixture of the catalyst, the charring agent and the blowing agent that are infused in the object's molecular structure. According to another exemplary embodiment, the improved heat or cold blocking properties are exhibited after the treated object is subjected to a temperature sufficient to allow intumescence to occur.

In one exemplary embodiment, the above noted method for treatment of an object further includes activating the treated object, where the activating includes heating the treated object to above a predetermined temperature value to allow intumescence to occur. In one exemplary embodiment, the object is one of a metallic object, a wooden object, or an object comprising a synthetic material. In another exemplary embodiment, the method for treatment of the object also includes applying a fire retardant coating to a surface of the object, the fire retardant coating comprising the catalyst, the charring agent, the blowing agent each having particles that are 8 microns or less in diameter, where the fire retardant coating provides additional heat or cold blocking capabilities for the object when the object is exposed to temperatures sufficient to cause intumescence to occur within the fire retardant coating.

Another aspect of the disclosed embodiments relates to an object with improved heat or cold blocking properties, that includes a component having been infused with a mixture comprising a catalyst, a charring agent and a blowing agent.

Each of the catalyst, the charring agent and the blowing agent includes particles that are 8 microns or less in diameter, and exposure of the component to a predetermined temperature causes intumescence to occur within the metallic component, and imparts increased heat or cold blocking capabilities to the component. In one exemplary embodiment, the component comprises one of a metal, a wood material, a fabric material or a plastic material. In another exemplary embodiment, the object is part of a consumer electronic device.

Another aspect of the disclosed embodiments relates to a method for treatment of a metallic object to exhibit increased heat or cold blocking properties. The method includes mixing equal amounts of a catalyst, a charring agent and a blowing agent, where each of the catalyst, the charring agent and the blowing agent includes particles that are 8 microns or less in diameter. The method also includes adding the mixture of the catalyst, the charring agent and the blowing agent to the metallic material that is in a molten state so as to cause the mixture of the catalyst, the charring agent and the blowing agent to reach intumescence, and cooling the molten mixture of the metallic material, the catalyst, the charring agent and the blowing agent, thereby causing the metallic material to acquire increased heat or cold blocking properties.

Another aspect of the disclosed embodiments relates to a structure with improved heat blocking characteristics that includes a material infused with particles of a mixture, where the mixture comprises a catalyst, a charring agent and a blowing agent that are mixed together in equal portions by weight, and the particles of the each of the catalyst, the charring agent and the blowing agent are 8 microns or less in diameter. In one exemplary embodiment, the material is one of copper, brass, bronze, steel, iron, lead or aluminum.

The above and other features and their embodiments or implementations are described in greater detail in the drawings, the description and the claims.

DETAILED DESCRIPTION

The disclosed compositions, structures and methods improve fire resistance characteristics of a variety of material, including but not limited to material used in a building structure, vehicles, electronics circuits and others. One popular method of decreasing the disadvantages of, for example, common building materials is to coat the building material with an intumescent coating. When exposed to heat, such coatings swell and char, forming a highly insulative non-flammable protective layer between the heat source and the substrate to which the coating is applied. Typical intumescent coatings include a catalyst, a charring agent, a blowing agent and a carrier, binder or medium.

The catalyst typically is a compound which decomposes to provide a source of phosphoric acid such as a sodium, potassium or ammonium salt, and makes the mixture sticky and rubbery when heated. One such suitable catalyst is ammonium polyphosphate available from Clariant as AP 422. The charring agent, also known as a carbonific, typically is a polyhydric alcohol such as pentaerythritol, dipentaerythritol or mixtures of the same. One such suitable charring agent is the PE 200 product available from Anhui Jinhe Industrial Company Ltd., in China whose distributor in the United States is ChemRex. The blowing agent produces a non-flammable gas, such as nitrogen, when exposed to intense heat which causes foaming of the char formed by the intumescent coating. The foaming increases the volume and insulating properties of the char. Typical blowing agents include melamine and urea. Melamine may be obtained from Anhui Jinhe Industrial Company Ltd., in China whose distributor in the United States is ChemRex.

A wide variety of carriers, binders or other mediums are used including natural and synthetic rubbers, PVC, polyurethane, acrylic resins, acrylic paints and epoxies. One advancement in intumescent coatings consists of substituting active groups in the carrier, binder or other medium for the charring agent and the blowing agent. In some cases, the carriers, binders or other mediums can produce undesirable traits in the coating. Such traits may include the production of toxic chemicals when the binder combusts or is exposed to heat. Other potentially undesirable traits associated with the carriers, binders or other mediums is the use of toxic or air polluting chemicals in the production of the carrier, binder or other medium. In some cases, intumescent coatings using carriers, binders or other mediums can be used to avoid or minimize such undesirable traits.

One aspect of the disclosed embodiments relates to a mixture that performs better when incorporated into an intumescent coating than any commercially available intumescent coating known to the inventor. Another aspect of the disclosed embodiments relates to a method of application of the mixture to metal that greatly decreases the heat conductive and absorptive properties of the metal. In some embodiments, the need for a binder is eliminated since the disclosed mixture impregnates the object to be protected and becomes part of that object, as will be discussed in further detail in this document.

One aspect of the disclosed embodiments relates to limiting the size of the catalyst, charring agent and blowing agent particles to about eight micrometers or less. The current state of the art uses catalysts, charring argents and blowing agents of approximately 325 mesh or larger (a sieve size of 0.044 mm). As will be described in more detail below, decreasing the particle size greatly increases the effectiveness of the mixture when used in intumescent coatings and when infused into the material to be protected. To this end, particle sizes of about 8 microns down to about 2 micron have been tested. It is understood, however, that particle sizes smaller than about 2 microns can also be used to impart similar material properties to the object to be protected and to significantly improve its heat (and cold) blocking properties. In one implementation, proportion of the ingredients by weight are about 33.3% to 44% catalyst, 25% to 33.3% charring agent and 31% to 33.3% blowing agent provided the total adds up to 100%.

Another aspect of the disclosed embodiments relates to applying the mixture to metal, wood and other materials under heat and pressure. The mixture permeates the metal, wood, or the other material and dramatically changes the heat conducting and absorptive properties of the metal, wood, or the other material thereby stabilizing its structural integrity of in the presence of heat, fire and/or cold.

In one exemplary embodiment, a mixture is prepared by thoroughly mixing ammonium polyphosphate, pentaerythritol and melamine with the particle size of each ingredient being approximately eight micrometers or less. For example, the mixture may be included in a conventional carrier or medium to form an intumescent coating. Such a mixture can be applied, for example, as a coating to any object or material to improve its heat/cold blocking characteristics.

In one specific example, a mixture of approximately 44% by weight of ammonium polyphosphate, approximately 25% by weight of pentaerythritol and approximately 31% by weight of melamine, each with a particle size of approximately eight micrometers were thoroughly mixed together in a ribbon mixer. Silicon Dioxide (e.g., Flogard SP) was then mixed into the mixture in an amount equal to 1% of the previous weight of the mixture. For example, if the total weight of the ammonium polyphosphate, pentaerythritol and melamine was 100 grams, then 1 gram of Flogard SP would be added. The resulting mixture is referred to as "2901 Formula." An intumescent coating was prepared by mixing approximately 35.8% by weight of Resin 813, approximately 8.97% by weight of Heloxy 505 and approximately 55.13% by weight of 2901 Formula. Immediately prior to application of the intumescent coating, an amount of catalyst approximately equal to 6.27% by weight was added to the mixture. The resulting intumescent coating was then subjected to the FAA 20-135 Jet Fire Test. Approximately 20 mils (0.02 inches) of the coating was applied to a ⅜ inch steel panel. The steel panel was then mounted vertically and the coated side was subjected to a temperature of 2000.degree. F. (+/−150.degree. F.).

To pass the FAA 20-135 Jet Fire test, the material must last for at least 15 minutes without burn through or failure. The disclosed coating lasted for approximately three hours without burn through or failure. The temperature on the uncoated or "back" side of the steel panel opposite the location of the heat application rose to approximately 420.degree. F. during the first 30 minutes of the test but then fell to a temperature of approximately 330.degree. F. which it maintained for the remainder of the testing time. When the test was ended after approximately three hours, the inventive coating still had not failed and there was no burn through. That result presents a very significant advancement over the current state of the art as most products that pass the test fail or allow burn through after approximately 16 minutes.

Figure 1:
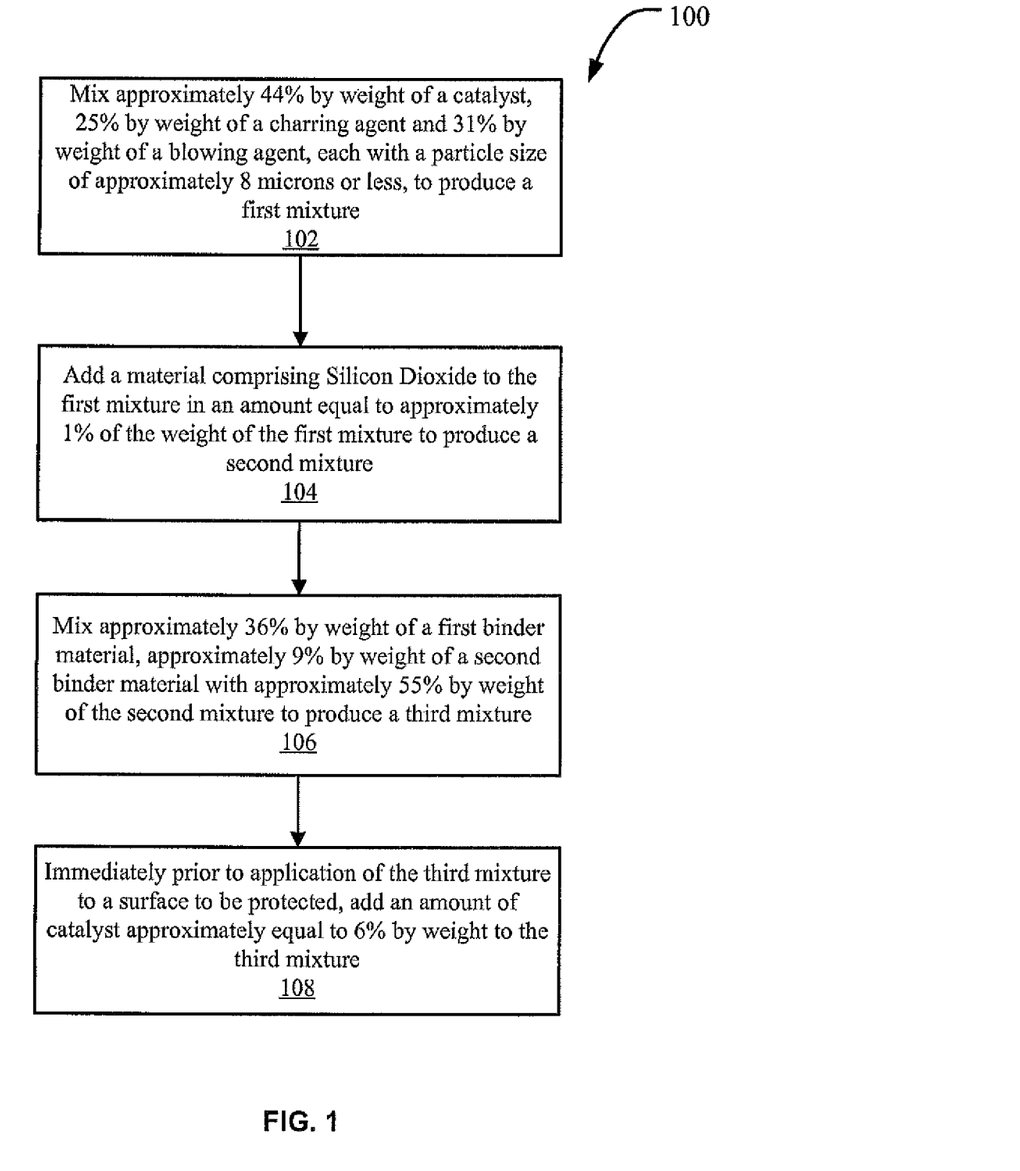
FIG. 1 illustrates a set of exemplary operations that can be carried out to prepare an intumescent material in accordance with an exemplary embodiment.

FIG. 1 illustrates a set of exemplary operations 100 that can be carried out to prepare an intumescent material in accordance with an exemplary embodiment. At 102, a first mixture is produced by mixing approximately 44% by weight of a catalyst, 25% by weight of a charring agent and 31% by weight of a blowing agent, each with a particle size of approximately 8 microns or less. As note above, the catalyst can, for example be ammonium polyphosphate, the charring agent can, for example, be pentaerythritol, and the blowing agent can, for example, be melamine. At 104, a second mixture is produced by adding to the first mixture a material comprising silicon dioxide (e.g., Flogard SP) in an amount equal to approximately 1% by weight of the first mixture. At 106, approximately 36% by weight of a first binder material, approximately 9% by weight of a second binder material is mixed with approximately 55% by weight of the second mixture to produce a third mixture. At 108, immediately prior to application of the third mixture to a surface that is to be protected, an amount of catalyst approximately equal to 6% by weight is added to the third mixture. It should be noted that the percentages that are recited in FIG. 1 are provided as examples, and these values can be varied to within a specified range.

The application of the above mixture as a coating to a material greatly enhances the materials heat and cold blocking properties. Due to high heat resistance of the coating, the material can be repeatedly exposed to high temperatures while still maintaining the structural integrity of the underlying object. Such an ability to provide sustained fire resistance capabilities can be described using the following example. Assuming that a coating that is approximately 25 microns thick is applied, in a fire event, one or two microns of the coating are consumed to produce intumescence. The remaining layers thus remain intact and can be activated (if needed) in subsequent fires. Thus even if the intumescent char is somehow removed or knocked off after the first fire event, the remaining layers can protect the underlying object in the event of additional fires. This recurring intumescence char will continue to be produced until all microns are consumed. In a particular case, where a coating of 3-5 mils (75-125 microns) is applied, such a coating can produce up to one hundred instances of intumescence. The char protects the substrate beneath the char from direct contact with flames or heat transfer, and thus, practical applications, more than 100 fire events can be tolerated. In fact, after removing the heat source, the char cools to the touch almost instantaneously.

In some embodiments, the need for a binder material is eliminated. Upon following a specific procedure to prepare and apply the mixture to the material to be protected (e.g., metal, wood, or other material), the particles of the mixture become integrated into the material such that, in some instances, visual inspection of the material before and after application of the mixture does not reveal any significant differences.

In one example embodiment, a mixture of equal parts by weight of ammonium polyphosphate, pentaerythritol and melamine with the particle size of each ingredient being approximately eight micrometers or less was produced and applied to a steel plate under heat and pressure. The mixture and the application method have been shown to reduce the heat conducting and absorptive properties of iron, steel, stainless steel, brass, aluminum, magnesium and other metals.

For instance, in one specific example, 33.3 ounces by weight of ammonium polyphosphate, 33.3 ounces by weight of pentaerythritol and 33.3 ounces by weight of melamine, each with a particle size of approximately eight micrometers were thoroughly mixed together. 32 ounces by volume of the resulting mixture was then added to one-half gallon of water inside a pressure cooker of appropriate size. The mixture was thoroughly stirred to evenly distribute the mixture. A 3/16 inch steel plate was then submerged within the pressure cooker. The lid to the pressure cooker was sealed and the appropriate weight to apply 15 lbs/sq. in. of pressure was placed on the pressure cooker. Heat was applied to the pressure cooker to boil the liquid and raise the pressure to 15 pounds per square inch and that pressure was maintained for 30 minutes. The pressure cooker was then allowed to cool. The steel plate was removed when cool enough to touch and was rinsed with cool water.

The plate treated above was heated with a Map-Pro hand torch from BernzOmatic with a flame temperature of approximately 3600.degree. F. for approximately 11 minutes. The temperature on the side of the plate opposite the flame application location reached only approximately 118.degree. F. The torch flame did not burn through the metal plate. Immediately after the 11 minute application (and upon turning off the flame), the temperature at the site where the flame was applied was approximately 705.degree. F. which is well below the temperature at which steel begins to lose its structural integrity. In addition, immediately after the 11 minute application, the temperature two inches away from the site where the flame was applied was only approximately 98.degree. F.

As a control for the above test, an untreated 3/16 inch plate of the same steel as used in the above test was heated with the same Map-Pro hand torch. The torch burned through the untreated plate in approximately 46 seconds. Accordingly, the treatment as described above is a significant improvement over the current state of the art.

Figure 2:
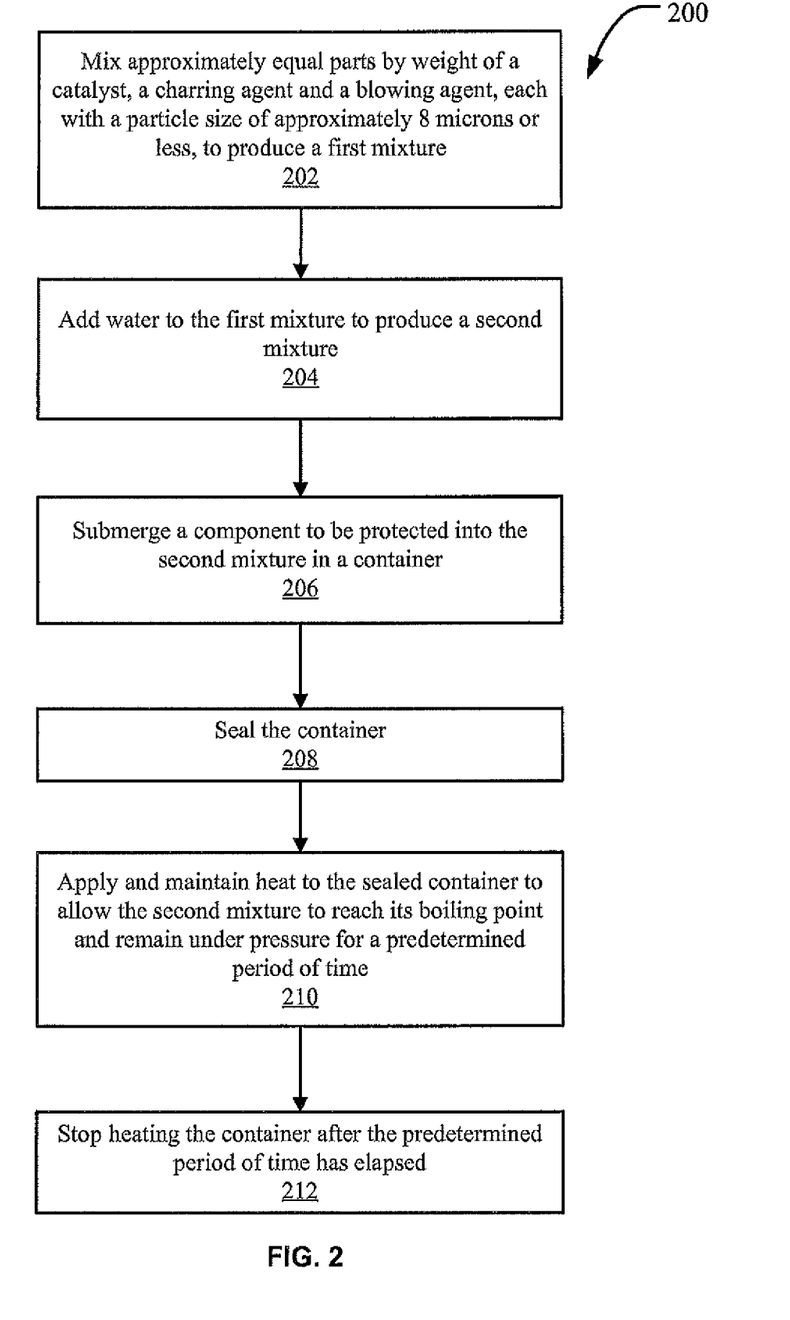
FIG. 2 illustrates another set of exemplary operations that can be carried out to infuse fire retardant material into a component in accordance with an exemplary embodiment.

FIG. 2 illustrates a set of exemplary operations 200 that can be carried out to infuse fire retardant material into a component in accordance with an exemplary embodiment. At 202, approximately equal parts by weight of a catalyst, a charring agent and a blowing agent, each with a particle size of approximately 8 microns or less, are mixed together to produce a first mixture. At 204, water is added to the first mixture to produce a second mixture. For example, two parts by volume of water is added to one part by volume of the first mixture to produce the second mixture. At 206, a material or component to be protected is submerged into the second mixture in a container, and at 208, the container is sealed. At 210, heat is applied to the sealed container and maintained to allow the second mixture to reach its boiling point and remain under pressure for a predetermined period of time. In one example, the heat is maintained for 55 to 60 minutes, and the pressure is maintained at 70 pounds per square inch. At 212, heating of the container is stopped after the predetermined period of time has elapsed. The component can then be removed from the container and allowed to be cooled.

The disclosed techniques can be applied for protection of a variety of metals, including, but not limited to, copper, brass, bronze, steel, iron, lead and aluminum. When such metals are treated with the disclosed mixture under the application of heat and pressure (as is, for example, described in connection with FIG. 2), the particles of the mixture become integrated into the metal structure. As a result the unique application method under heat/pressure, the small size particles (i.e., below approximately 8 microns-sometimes referred to as nano particles) become stacked up against the metal's (or other material's) cell structure. Upon activation of the mixture via exposure to high temperatures, each tiny particle's intumescent and interlocking properties produces a high barrier against heat and/or cold in the material as a whole, and results in significantly improved heat/cold transfer blocking properties. It is believed that, for instance, the nano particles that are embedded within the metal's cell structure create a new form of the metal with these desirable temperature resistance properties. The treated object, once activated (e.g., via exposure to high temperatures) to allow intumescence to set in, obtains the heat and cold transfer-blocking properties. Such improved heat/cold blocking properties have been demonstrated for mixtures that were produced using particle sizes between 8 microns down to 2 microns. In some cases, the average particle size was 8 microns.

In one example, the cold/heat blocking properties of the a treated object (e.g., a metal object with the mixture as outlined above) is activated by exposing the treated object to about 705.degree. F. for a duration of time between 1 to 2 minutes. Such a "pre-activated" object can then be used for any suitable application, such as for incorporation into building structures, into heat/cold resistance containers, into vehicles, etc.

In another example, a piece of lead material was treated with the disclosed mixture using a method similar to that in FIG. 2. Tests revealed that the melting point of the treated lead material was increased to approximately 3000.degree. C. (from the 327.degree. C. melting point of untreated lead). The improved heat resistance characteristics that can be imparted to lead components can have a significant impact on the battery industry that is plagued with fires caused by overheating of the batteries. Providing improved fire resistance properties for battery components can impact a wide-range of industry, including consumer electronics, electric vehicles, aerospace industries and others.

It is also important to note that activation of the treated material does not deform or change the visual appearance and physical dimensions of the treated material in any appreciable fashion. The activated material, however, aside from improved heat/cold blocking characteristics, also exhibits improved strength and rust-resistance properties. Based on tests conducted by the inventors, the treated material appears to get stronger as the material is exposed repeatedly to high temperatures. In one test scenario, a piece of copper that was treated by the disclosed mixture in accordance with the above described procedure was heated 93 separate times to 5300 degrees (e.g., each for duration of approximately 3 minutes). After each exposure, the copper appeared to get stronger as evident by an inability to manually tear or break the copper piece. In comparison, it only takes about 3 seconds to burn through the same piece of untreated copper at 5300 degrees.

The techniques and materials that are described in the present application can also be used for improving fire resistance properties of a variety of non-metals such as plastics, fabrics, wood, fiberglass, flexible firewall barriers and others. For instance, in order to apply the mixture to plastics, the catalyst, the charring agent and blowing agent that are in powder form are first pelletized and then applied to the plastic that is in molten form. Once cooled, the improved heat/cold blocking properties are imparted to the plastic material. In another example, the coating is applied to a piece of wood by following a similar procedure that is described in FIG. 2. That is, the piece is placed into the mixture that is heated under pressure.

In one example, the mixture is applied as a coating to fiberglass e.g., 4 oz. per square yard, creating a 3 mm to 5 mm thick coating that exhibits a 3-hour threshold for protecting items that are placed behind the fiberglass barrier. In another example, the mixture is applied to two pieces of flat material (e.g., on both sides of each piece). By placing conventional packaging material (e.g., bubble wrap) between the two treated pieces, a dynamic and flexible protective packing material is created. Similarly, cardboard layers can be treated and assembled (e.g., folded) to form fire proof boxes.

It should be noted that the disclosed techniques and materials can be used in any desired combination to impart improved heat, cold or rust resistance properties to a material, or to improve the material's strength. For instance, heat/cold blocking properties of a material can be improved by infusion of the disclosed mixture into the material under heat and pressure, as well as application of the appropriate mixture as a coating to the treated material. Alternatively, one or the other method of treatment (e.g., application as a coating or infusion under heat/pressure) may be used.

One exemplary method of treating a metal includes providing a mixture of equal parts by weight ammonium polyphosphate, pentaerythritol and melamine each in a particle size of approximately eight micrometers or less, contacting the mixture with the surface of a portion of metal while heating the metal to a temperature of approximately 212.degree. F. or more under pressure of at least approximately 15 lbs/sq. in. for a period of at least approximately 30 minutes, and cooling the metal.

In some embodiments, the appropriate mixture of catalyst, charring agent and blowing agent may be added to an object that is in molten state. For example, the mixture in the powder form, having particle sizes of 8 microns or less, can be added to and thoroughly mixed with a molten metal (e.g., lead, copper, steel, etc.) as a percentage of volume of the molten material (e.g., 15-20% by volume). Due to the high temperatures of the molten material, intumescence is set and the mixture is activated immediately, and upon cooling of the molten material, the material obtains the improved heat/cold blocking properties that were described above. Production of a treated material using the above procedure avoids the use of high pressures, and provides a safer alternative. For example, such a procedure can be used in construction, military, or aerospace projects in which various components can be custom-ordered from a foundry.

Figure 3:
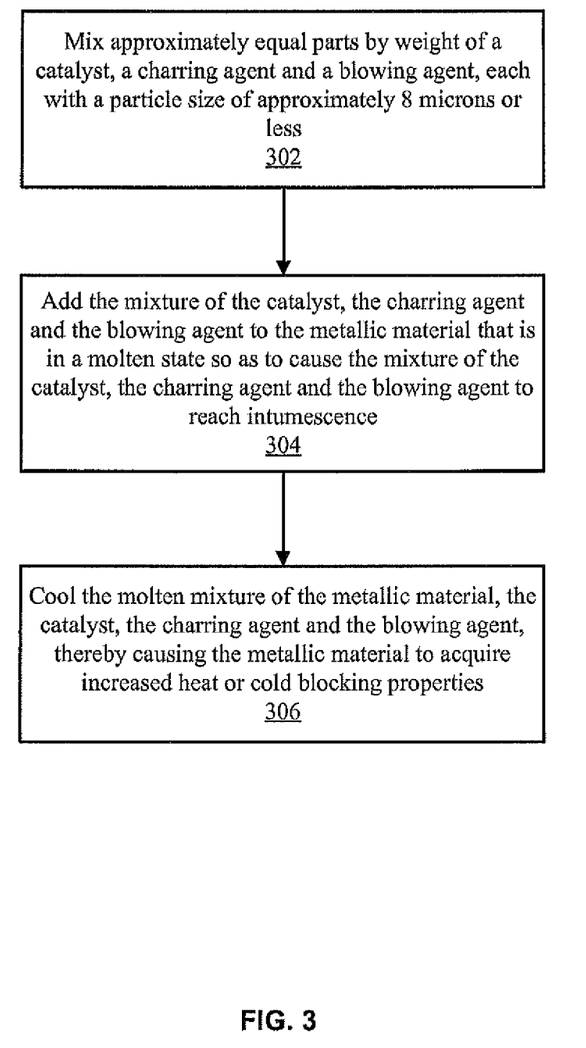
FIG. 3 illustrates another set of exemplary operations that can be carried out to treat a metallic material to exhibit increased heat or cold blocking properties in accordance with an exemplary embodiment.

FIG. 3 illustrates a set of exemplary operations 300 that can be carried out to treat a metallic material to exhibit increased heat or cold blocking properties in accordance with an exemplary embodiment. At 302, approximately equal parts by weight of a catalyst, a charring agent and a blowing agent, each with a particle size of approximately 8 microns or less, are mixed together. At 304, the mixture of the catalyst, the charring agent and the blowing agent are added to the metallic material that is in a molten state so as to cause the mixture of the catalyst, the charring agent and the blowing agent to reach intumescence. At 306, the molten mixture of the metallic material, the catalyst, the charring agent and the blowing agent is cooled, causing the metallic material to acquire increased heat or cold blocking properties.

The disclosed materials, and the methods of their application, find use in virtually unlimited fields of technology. For example, treated metal (e.g., steel) material can be used for construction of containers (or components thereof) and to allow transportation and storage of combustible material (or any hazardous material) in containers that exhibit significantly improved heat resistance properties. The use of such improved containers can, for example, enable safer transportation of fuel tankers via trains, planes, trucks, or ocean vessels. Other applications of the disclosed materials and methodologies relate to the automotive industry. For example, all or portions of vehicle engines can be modified to include the treated material that is produced according to the disclosed methods, thereby producing engines that are capable of withstanding higher temperatures.

Space and aeronautics industries are among others fields that can benefit from the disclosed material with improved heat/cold resistance properties. For instance, components of space vehicles can be treated in accordance with the disclosed materials and methods to protect such vehicles from extreme high temperatures experienced upon exit from, and entry to, planetary surfaces. Additionally, the cold-blocking properties of the treated components provide improved protection against the extreme cold temperatures of outer space. The use of the disclosed material, which also exhibit improved strength, can thus enable multiple (or additional) exit and landing opportunities for spacecraft. In other examples, the treated materials of the present application can be used in components of jet engines and other airplane components that may be subject to high temperatures.

Further applications of the disclosed materials and methodologies include their use in consumer products. Aside from the previously described improvements related to batteries that are included in such consumer products, various other components that generate high heat/temperatures can be encased, or manufactured, using the disclosed materials. For instance, display and projection devices that use plasma technology can benefit from improved temperature performance that is imparted by the disclosed material to the various metal or non-metal components.

In applications that the infusion of particles into the structure of the material is not possible, or not feasible, the disclosed mixtures can be applied as coatings to improve fire/cold retardant characteristics of the treated material. One example, includes applying the disclosed mixtures to various fabrics to produce fire suits.

Figure 4:
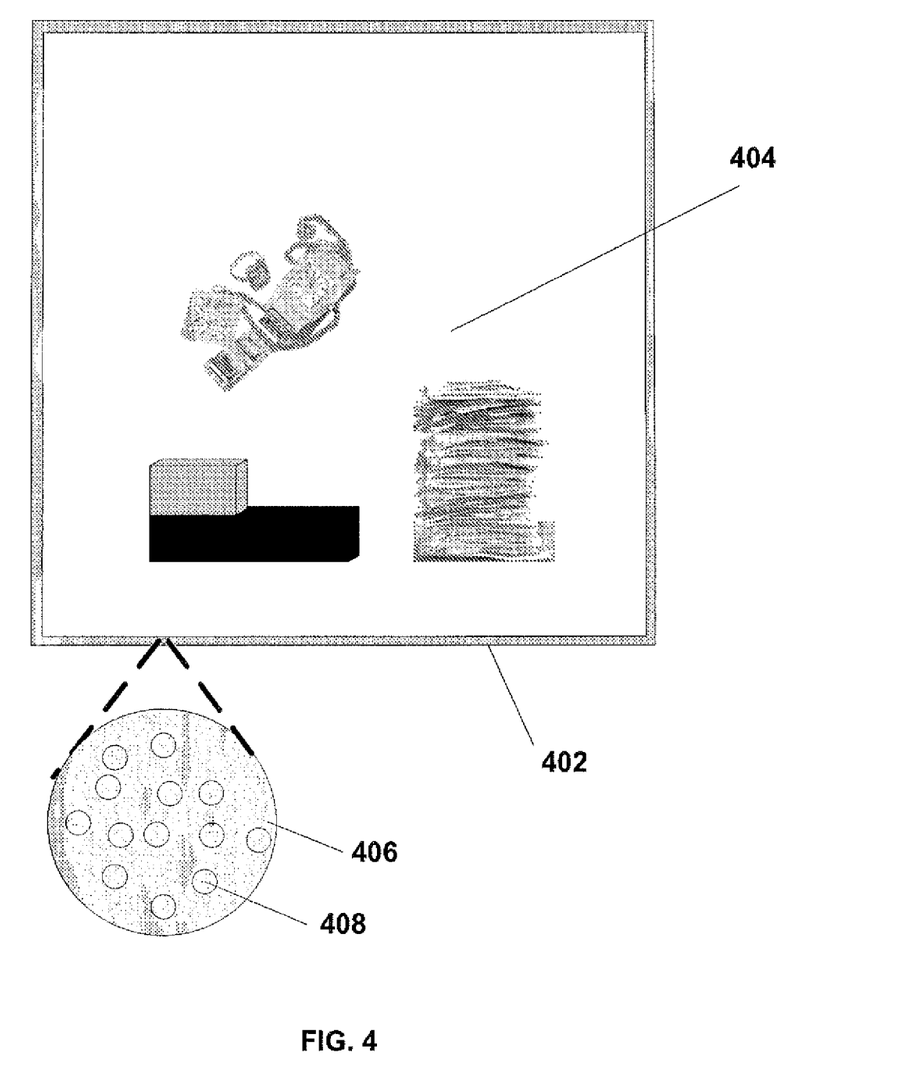
FIG. 4 illustrates the use of the disclosed structures for protection of various items in accordance with an exemplary embodiment.

FIG. 4 illustrates the use of the disclosed structures for protection of various items in accordance with an exemplary embodiment. The structure 402 with improved heat blocking characteristics can, for example, be part of safe or a vault that protects various items of value 404, such as jewelry, gold, documents, etc. A magnified illustration of the structure 406 shows small particles (about 8 microns of less in diameter) 406 that are infused into the structure 402 that forms the walls of the vault.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A mixture suitable for imparting heat or cold blocking properties to an object, comprising:
　　a catalyst comprising particles that are 8 microns or less in diameter;
　　a charring agent comprising particles that are 8 microns or less in diameter,
　　a blowing agent comprising particles that are 8 microns or less in diameter; and
　　water in an amount that, by weight, is equal or greater than weight of the mixture of the catalyst, the charring agent and the blowing agent added together.

2. The mixture of claim 1, wherein the amount of water by weight is twice the weight of the mixture of the catalyst, the charring agent and the blowing agent added together.

3. The mixture of claim 1, wherein the charring agent is ammonium polyphosphate, the charring agent is pentaerythritol, and the blowing agent is melamine.

4. The mixture of claim 1, wherein each of the catalyst, the charring agent and the blowing agent includes particles in the range of 2 microns to 8 microns.

5. The mixture of claim 1, wherein at least one of the catalyst, the charring agent or the blowing agent includes particles that are 2 microns in diameter.

6. The mixture of claim 1, wherein at least one of the catalyst, the charring agent or the blowing agent includes particles that on average are 8 microns in diameter.

7. The mixture of claim 1, wherein the mixture, when applied to a 3/16 inch-thick steel object, imparts heat blocking characteristics to the steel object, such that the steel object remains intact after application of at least 3600° F. heat for 11 minutes or longer.

8. The mixture of claim 1, wherein each of the catalyst, the charring agent and the blowing agent includes only particles that are 8 microns or less in diameter.

9. A method for treatment of an object to exhibit increased heat or cold blocking properties, comprising:
   mixing equal amounts of a catalyst, a charring agent and a blowing agent, wherein each of the catalyst, the charring agent and the blowing agent includes particles that are 8 microns or less in diameter;
   adding water in an amount that, by weight, is equal or greater than weight of the mixture of the catalyst, the charring agent and the blowing agent added together, to the mixture of the catalyst, the charring agent and the blowing agent;
   placing the object submerged in the mixture including the water, the catalyst, the charring agent and the blowing agent in a sealable container;
   sealing the container;
   applying heat to the container for a predetermined period of time so as to allow the pressure inside the container to reach and remain at a predetermined pressure value;
   stopping application of heat to the sealed container; and
   allowing the object to be cooled, thereby producing a treated object that possesses improved heat and cold blocking properties compared to the object prior to the treatment.

10. The method of claim 9, wherein the charring agent is ammonium polyphosphate, the charring agent is pentaerythritol, and the blowing is melamine.

11. The method of claim 9, wherein the predetermined pressure value is 70 pounds per square inch.

12. The method of claim 9, wherein the predetermined pressure value is 15 pounds per square inch.

13. The method of claim 9, wherein the treated object comprises particles of the mixture of the catalyst, the charring agent and the blowing agent that are infused in the object's molecular structure.

14. The method of claim 9, wherein the improved heat or cold blocking properties are exhibited after the treated object is subjected to a temperature sufficient to allow intumescence to occur.

15. The method of claim 9, further comprising activating the treated object, the activating comprising heating the treated object to above a predetermined temperature value to allow intumescence to occur.

16. The method of claim 9, wherein the object is one of a metallic object, a wooden object, or an object comprising a synthetic material.

17. The method of claim 9, further comprising applying a fire retardant coating to a surface of the object, the fire retardant coating comprising the catalyst, the charring agent, the blowing agent each having particles that are 8 microns or less in diameter, wherein the fire retardant coating provides additional heat or cold blocking capabilities for the object when the object is exposed to temperatures sufficient to cause intumescence to occur within the fire retardant coating.

18. A method for treatment of a metallic material to exhibit increased heat or cold blocking properties, comprising:
   mixing equal amounts of a catalyst, a charring agent and a blowing agent, wherein each of the catalyst, the charring agent and the blowing agent includes particles that are 8 microns or less in diameter,
   adding water in an amount that, by weight, is equal or greater than weight of the mixture of the catalyst, the charring agent and the blowing agent added together, to the mixture of the catalyst, the charring agent and the blowing agent;
   adding the mixture of the catalyst, the charring agent, the blowing agent and water to the metallic material that is in a molten state so as to cause the mixture of the catalyst, the charring agent and the blowing agent to reach intumescence; and
   cooling the molten mixture of the metallic material, the catalyst, the charring agent and the blowing agent, thereby causing the metallic material to acquire increased heat or cold blocking properties.

19. The method of claim 18, wherein the amount of water by weight is twice the weight of the mixture of the catalyst, the charring agent and the blowing agent added together.

20. The method of claim 18, wherein the charring agent is ammonium polyphosphate, the charring agent is pentaerythritol, and the blowing agent is melamine.

* * * * *